US008713535B2

(12) United States Patent  (10) Patent No.: US 8,713,535 B2
Malhotra et al.  (45) Date of Patent: Apr. 29, 2014

(54) RELIABLE AND ACCURATE USAGE DETECTION OF A SOFTWARE APPLICATION

(75) Inventors: Nipoon Malhotra, Bellevue, WA (US); Ram Viswanathan, Kirkland, WA (US); Vikram Kakumani, Kirkland, WA (US); Mauktik H. Gandhi, Redmond, WA (US); Sarath Madakasira, Kirkland, WA (US); Yiming Li, Redmond, WA (US); Kiran Sagi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1261 days.

(21) Appl. No.: 12/165,603

(22) Filed: Jun. 30, 2008

(65) Prior Publication Data

US 2009/0327482 A1  Dec. 31, 2009

(51) Int. Cl.
*G06F 9/44* (2006.01)
(52) U.S. Cl.
USPC ............................ 717/127; 717/126; 717/131
(58) Field of Classification Search
USPC ................. 717/104–115, 124–126, 168–178; 709/201–226; 719/311–332
See application file for complete search history.

(56) References Cited

U.S. PATENT DOCUMENTS

| | | | |
|---|---|---|---|
| 5,485,574 A | 1/1996 | Bolosky et al. | |
| 5,590,056 A * | 12/1996 | Barritz | 702/186 |
| 6,026,236 A | 2/2000 | Fortin et al. | |
| 6,085,218 A | 7/2000 | Carmon | |
| 6,209,125 B1 * | 3/2001 | Hamilton et al. | 717/125 |
| 6,230,309 B1 * | 5/2001 | Turner et al. | 717/107 |
| 6,370,686 B1 * | 4/2002 | Delo et al. | 717/174 |
| 7,076,768 B2 | 7/2006 | Li et al. | |
| 7,197,431 B2 | 3/2007 | Barritz | |
| 7,243,271 B2 | 7/2007 | Teegan et al. | |
| 7,523,191 B1 * | 4/2009 | Thomas et al. | 709/224 |
| 7,590,508 B1 * | 9/2009 | Saghier et al. | 702/182 |
| 7,716,335 B2 * | 5/2010 | Dinker et al. | 709/226 |
| 7,925,635 B1 * | 4/2011 | Ravulur et al. | 707/688 |
| 2003/0004974 A1 | 1/2003 | Wang et al. | |
| 2005/0182750 A1 | 8/2005 | Krishna et al. | |
| 2005/0278700 A1 | 12/2005 | Buskens et al. | |
| 2007/0038974 A1 * | 2/2007 | Albahari et al. | 717/101 |
| 2008/0148039 A1 * | 6/2008 | Cobb et al. | 713/100 |

OTHER PUBLICATIONS

Classify, Merriam-Webster [online], retrieved from www.merriam-webster.com/dictionary/classify (retrieved on Mar. 30, 2011).*
Classes, Merriam-Webster [online], retrieved from www.merriam-webster.com/dictionary/classes (retrieved on Mar. 30, 2011).*

(Continued)

*Primary Examiner* — Satish Rampuria
(74) *Attorney, Agent, or Firm* — Mayer & Williams, PC

(57) ABSTRACT

Use of software applications is detected by categorizing components of applications into a usage manifest and implementing a usage detection background service on a client PC that monitors the components according to the usage manifest. The application components are categorized based on the mode of user interaction as well as the component's correlation to active use of an application. The background service tracks events and activities associated with the application components to generate usage metrics that include the frequency of unique launches of an application and the duration of each unique use. A usage manager for the background service may utilize the usage metrics for a component independently, or combine metrics for multiple components in cases where applications work in an interactive manner (such as a plug-in to a web browser) in order to compute application usage by comparing the metrics against predefined thresholds.

26 Claims, 5 Drawing Sheets

(56) References Cited

OTHER PUBLICATIONS

Hilbert et al., Agents for Collecting Application Usage Data Over the Internet, Autonomous Agents, Minneapolis, MN, USA Copyrlghr 1998, pp. 149-156.*

Alan L. Teubner & Jerry J. Vaske (1988): Monitoring computer users' behaviour in office environments, Behaviour & Information Technology, 7:1, pp. 67-78.*

Günther, C., et al., Monitoring deployed application usage with process mining, BPM Center Report BPM-08-11 (2008), pp. 1-8.*

Zhang, et al., "System Support for Automatic Profiling and Optimization", 1997, p. 01-12, © 2007 The Pennsylvania State University.

Vaidyanathan, et al., "MSET Performance Optimization for Detection of Software Aging", Fast Abstract ISSRE, 2003, p. 01-02.

* cited by examiner

FIG. 2

Usage Manifest

```
<AppInfo name='ABC APP' description='some application' uninstallDisplayName='ABC'
versionMin='1.0' versionMax='2.0'>
    <File relativePath='Process1.exe' usageCategory='PrimaryProcess'/>
    <File relativePath='WindowProcess1.exe' usageCategory='OpenUIWindow'/>
    <File relativePath='Aux.exe' usageCategory='AuxiliaryProcess'/>
    <Combination>
        <File relativePath='ProcessA.exe' usageCategory='NetworkPort'/>
        <File relativePath='ProcessB.exe' usageCategory='UIWindowInFocus'/>
        <Relationship type='Cotemporaneous'/>
    <AppInfo />
```

RELIABLE AND ACCURATE USAGE DETECTION OF A SOFTWARE APPLICATION

BACKGROUND

Understanding when software applications are being used can be important to operating systems and management applications that run on or interact with a personal computer ("PC"). For example, knowing application usage can enable effective management of applications, track license usage, place restrictions on time or permissions, and identify authorized use of applications. In addition, PC users often wish to disable or remove unused or infrequently used applications in order to optimize system performance or free up resources.

Reliably and accurately detecting application usage can be difficult because not all applications that may be running on the PC may actually be used. In addition, there are typically several different ways in which a user may interact with an application. For example, one application may support user interaction through a user interface ("UI") window displayed on the PC's desktop, while another application may be accessed via an icon in the desktop taskbar notification area (often referred to as the "system tray" which is loaded by SysTray.exe in Microsoft Windows® operating system environments). In some cases, an application is used indirectly by a user by providing services to other applications or by being used within a web browser.

Unfortunately, while providing satisfactory performance in some scenarios, many existing software application usage detection techniques are often unreliable and inaccurately detect application usage in some cases. For example, existing techniques may apply heuristics to match start menu program entries with the list of installed programs. They will then simply track how often a particular program is launched from the start menu. Such techniques disregard the diversity in usage pattern of applications and apply a technique that is only relevant for a small subset of all the applications. These techniques also fail to recognize that not all components of an application are correlated with active use of the application by the computer user. As a result, such existing techniques may report that an application is used frequently when in fact it is not, or may miss identification of frequently used applications.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Use of software applications is detected by categorizing components of applications into a usage manifest and implementing a usage detection background service on a client PC that monitors the components according to the usage manifest. The application components are categorized based on the mode of user interaction as well as the component's correlation to active use of an application. The background service tracks events and activities associated with the application components to generate usage metrics that include the frequency of unique launches of an application and the duration of each unique use. A usage manager for the background service may utilize the usage metrics for a component independently, or combine metrics for multiple components in cases where applications work in an interactive manner (such as a plug-in to a web browser) in order to compute application usage by comparing the metrics against predefined thresholds.

The present arrangement for detecting software usage employs extensible techniques that are tailored to individual components by taking the diversity of applications' usage patterns into account. And, instead of viewing an application as a homogenous set of components, the techniques are arranged to differentiate among components. Thus, for example, components having a high correlation with active application usage are monitored by the background service while other components that provide maintenance functionality like pre-loaders and auto-updaters may be ignored.

Illustrative examples of application components include the main or primary processes of applications that are highly correlated to active application usage, UI windows that are open or have focus on the desktop, pop ups that are displayed, browser and application plug-ins, processes that open network ports and/or exchange data packets over a network, user actions with a file system, processes that create and/or remove certain files at certain locations, and auxiliary processes that are not typically correlated with usage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 2 is an illustrative schema for a usage manifest that may be utilized for automated detection of software usage;

Like reference numerals indicate like elements in the drawings.

DETAILED DESCRIPTION

Existing algorithms and methods typically apply heuristics to match start menu program entries with the list of installed programs on a PC. They then simply track how often a particular program is launched from the start menu. However such straightforward but overly simple techniques often fail to reliably and accurately detect usage of software applications on desktop PCs because they do not fully reflect the complexity of the usage pattern of the applications nor do they recognize that not all components of an application are highly correlated with active use of the application by the user.

Software applications have diverse functionality and hence equally diverse ways of being used. This diversity often translates into very diverse user interaction patterns. For example word processing applications like Microsoft Word™ typically require extensive interaction with a UI, while computer protection and maintenance software such as Microsoft OneCare™ primarily provides silent real time protection against malware. Real Network, Inc.'s RealPlayer® can be used for playing music in the background or streaming music inside a web browser such as Microsoft Internet Explorer® with limited UI interaction, while Gmail Notifier software by Google Inc. provides alerts about new e-mail messages through pop-ups and toasts. Existing algorithms and methods which apply simple techniques that are only relevant for a subset or class of applications cannot always detect usage of applications because of the diversity of these usage patterns.

Software applications are composited from multiple modules or components which serve different purposes. These include, for example, startup components that provide maintenance functions like pre-loaders, updates, etc., components that support real time monitoring services, components supporting processes that maintain UIs, browser add-ons, extensions to applications like e-mail, and the like. Some of these components may continuously run in the background at all times while others may be used for supporting active user interaction or for providing some specific functionality to users. In addition, some of the background processes may run on a PC irrespective of whether the application is actually used by the user. Thus, simply tracking if any component of an application is being executed on the PC will typically give an incorrect estimate of how often an application is actually being used.

Figure 1:
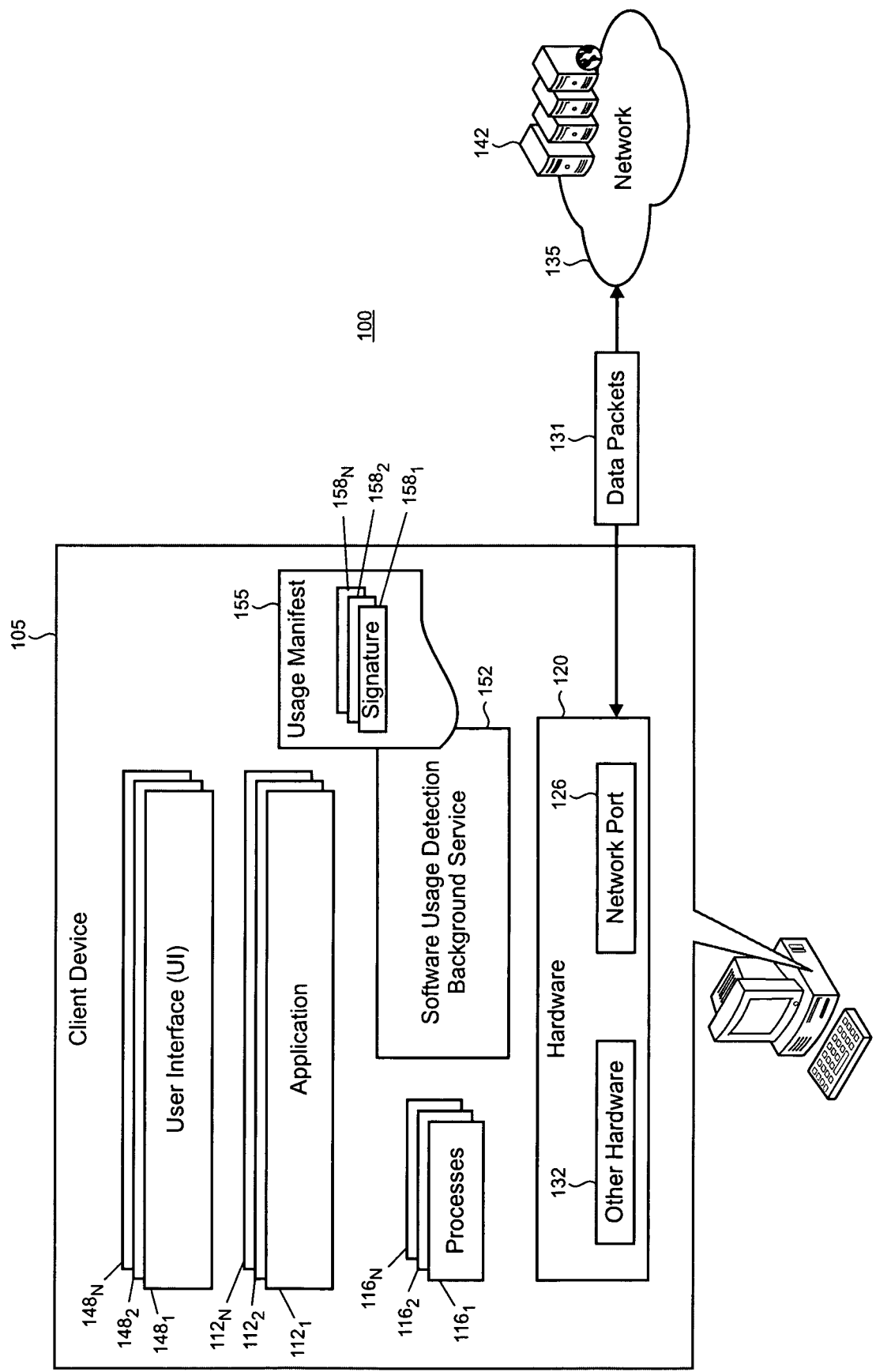
FIG. 1 shows an illustrative computing environment in which the present software usage detection may be implemented.

Turning now to the drawings, FIG. 1 shows an illustrative computing environment 100 in which the present arrangement for reliable and accurate software usage detection may operate. A client PC 105 hosts a plurality of software applications $112_{1, 2 \ldots N}$ comprising instructions which execute as various processes $116_{1, 2 \ldots N}$ in memory. A given application 112 may execute more than one process 116, so one-to-one mapping between the applications 112 and processes 116 is not necessarily implied. A hardware layer 120 provides an abstraction of hardware in the client PC 105 to the applications 112. The hardware includes, in this example, a network port 126 and other hardware 132. The network port 126 may be opened on the client PC 105 to exchange data packets 131 over an external network 135 (such as a local area network or a wide area network like the Internet) with other computing resources or servers which are collectively identified by reference numeral 142.

In some cases, an application 112 is configured to provide an interactive user experience through one or more UIs $148_{1, 2 \ldots N}$. As with the processes 116, one-to-one mapping between applications 112 and UIs 148 is not implied. In addition, not all the applications 112 necessarily utilize a UI such as an application that performs silent real time monitoring. The UIs 148 can be implemented to appear in different ways on the PC's desktop such as fully interactive windows, pop-up windows/notifications, or as system tray objects, for example.

A software usage detection background service 152 is also instantiated on the client PC 105. The background service 152 is arranged to monitor, according to a usage manifest 155, the modules or components (hereinafter referred to as "component(s)") that are associated with the applications 112 in order to calculate software usage. The usage manifest 155 is utilized to categorize the components of an application 112 according to a correlation of the component to active usage of the application, and by the mode of interaction with the component. This categorization enables usage signatures $158_{1, 2 \ldots N}$ for respective applications 112 to be created. The signatures in the usage manifest 155 may then be used by the background service 152 to detect software application usage in an automated manner.

The application signatures provided by the usage manifest 155 may be generated through an analysis of a given application 112 using manual processes, automated processes, or combinations thereof. The usage manifest 155 is published to the PC 105 and will typically include entries pertaining to each of the applications 112 that are installed on the client PC 105.

An illustrative generalized schema 200 for a usage manifest 155 expressed in XML (eXtensible Markup Language) is shown in FIG. 2. However, it is noted that the use of XML is exemplary, and other formats may also be used depending on the requirements of a particular implementation. In this example, the elements in the schema 200 include categorization based on primary (i.e., main) processes that are highly correlated to actual application usage (as indicated by reference numeral 205), user interaction provided by a UI (210), and auxiliary processes (215). Combinations of interactions between application components may also be monitored by the background service 152 (220).

The categorization of primary processes 205 enables application usage to be computed by monitoring those processes 116 which are highly correlated to active use. That is, such processes run when an application 112 is being actively used and they terminate when the application is no longer being actively used. These highly correlated primary processes 205 are thus handled differently from application components that provide, for example, maintenance functionality like pre-loaders and auto-updaters.

The categorization of UI interaction 210 enables detection of application usage by monitoring interaction patterns with the UIs 148. In this case, application components with heavy UI interaction are handled differently from those which provide, for example, silent real-time monitoring with light or no UI interaction.

The auxiliary processes 215 include those which do not have any correlation with usage, for example, by running irrespectively whether an application is being used or not. By categorizing auxiliary processes 215, more subtle interactions and integration between application components may be monitored to detect application usage. For example, auxiliary processes 215 may involve ActiveX controls in a web browser for streaming media to a media player such as RealPlayer, or an SMS (short message service) plug-in to an e-mail and messaging application such as Microsoft Outlook®.

Combination interactions 220 enable more complex interactions between application components to be monitored to detect application usage. For example, when being actively used, a window from a UI 148 and a network port 126 may be opened by an application 112 at the same time.

Figure 3:
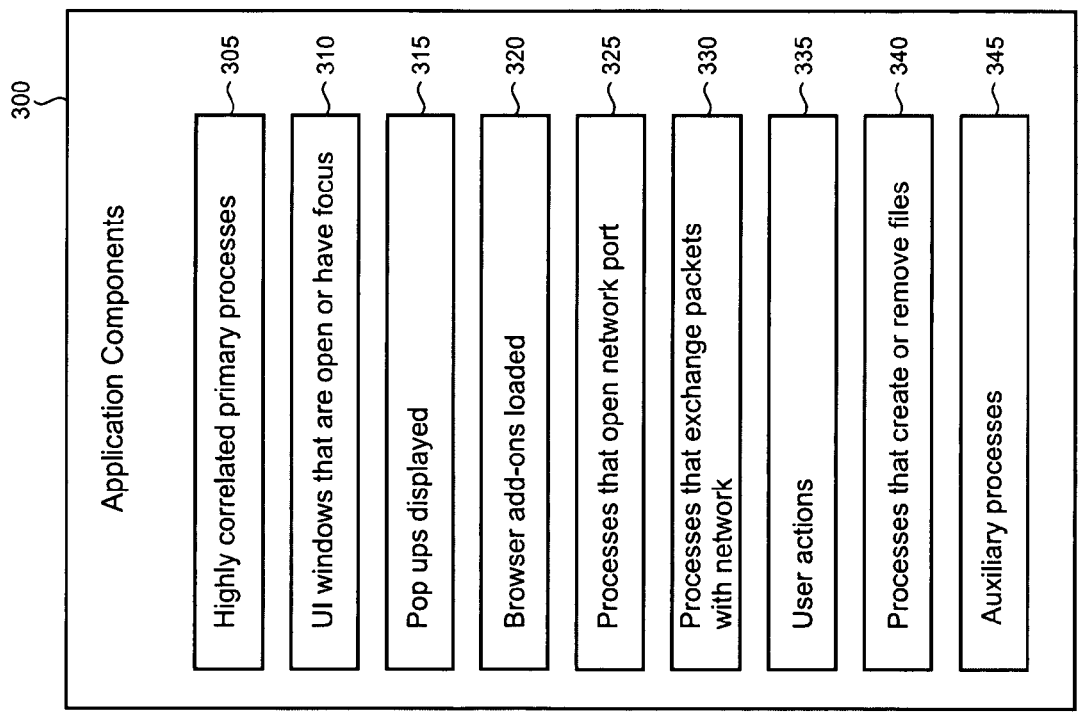
FIG. 3 shows illustrative application components that may be categorized by mode of interaction and correlation with active application usage and used by a software usage detection background service.

FIG. 3 shows a more specific set of illustrative examples of application components 300 that may be categorized in the usage manifest 155 for monitoring by the background service 152. Depending on the needs, various ones of the application components 300 may be monitored by the background service 152 and not all the components shown in FIG. 3 necessarily need to be used in a given implementation of the present usage detection arrangement.

Application component 305 includes a highly correlated primary process. This is typically the main process of an application, the execution of which is highly correlated to active usage. As noted above, process behavior could be that it runs while an application 112 is being used and exits when the application is not being actively used.

Application component 310 includes a UI window that is opened by an application or has focus (i.e., receives input events such as mouse clicks and/or is positioned as the top window in the desktop's application display order, "Z-order") when the application 112 is being actively used. UI windows may include both highly-interactive main UI windows as well as system tray objects, for example.

Application component 315 includes a pop up window, for example one provided by a pop up toaster component or service, that is displayed as a UI 116 when an application 112 is being actively used. Tracking pop ups allows, for example, usage detection of applications that perform monitoring of the client PC 105 such as anti-virus and anti-spyware programs. Such programs often use pop up windows to notify the user that an incident has occurred or some user action may be necessary.

Application component 320 includes a browser add-on that may execute within a web browser while an application 112 is being actively used. As noted above, an example of such a browser add-in includes ActiveX controls.

Application component 325 includes any process 116 that opens a network port (e.g., network port 126) when an application 112 is being actively used. Examples of such applications may include, for example, peer-to-peer file sharing service client applications.

Application component 330 includes any process 116 that exchanges data packets 131 on the network 135 when an application 112 is actively being used. This scenario may be distinguished from the network port opening example above as not all applications necessarily have high levels of data exchange when they are active.

Application component 335 includes user actions with a UI 148 supporting file systems like Microsoft Windows Explorer that indicate active use of a particular application 112. For example, a user may launch an application 112 from a desktop shortcut or a start menu item.

Application component 340 includes the creation or removal of certain files at certain locations that indicate active use of an application 112.

Application component 345 includes auxiliary processes. As noted above, these processes do not necessarily have any correlation with usage of an application 112, and may run irrespective of whether an application is being used or not.

Figure 4:
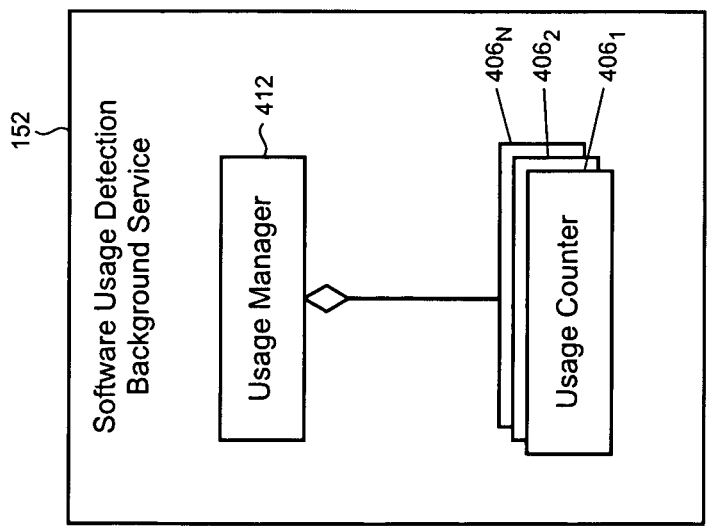
FIG. 4 is a diagram of an illustrative architecture for a software usage detection background service.

FIG. 4 shows an illustrative architecture for the background service 152 expressed as a UML diagram (Unified Modeling Language) which includes a multiplicity of usage counters $406_{1, 2 \ldots N}$ and a usage manager 412. The background service 152 is arranged to be extensible and thus may collect information from the usage counters 406. Each counter 406 is specialized for monitoring metrics associated with one or more of the different application components 300 that are included within the usage manifest 155. A usage counter 406 may perform such monitoring using polling where it periodically queries the application component. Alternatively, the monitoring may be event driven. Data from other sources may also be obtained including, for example, event tracing, file system file creates, system tray icon clicks, the like.

Figure 5:
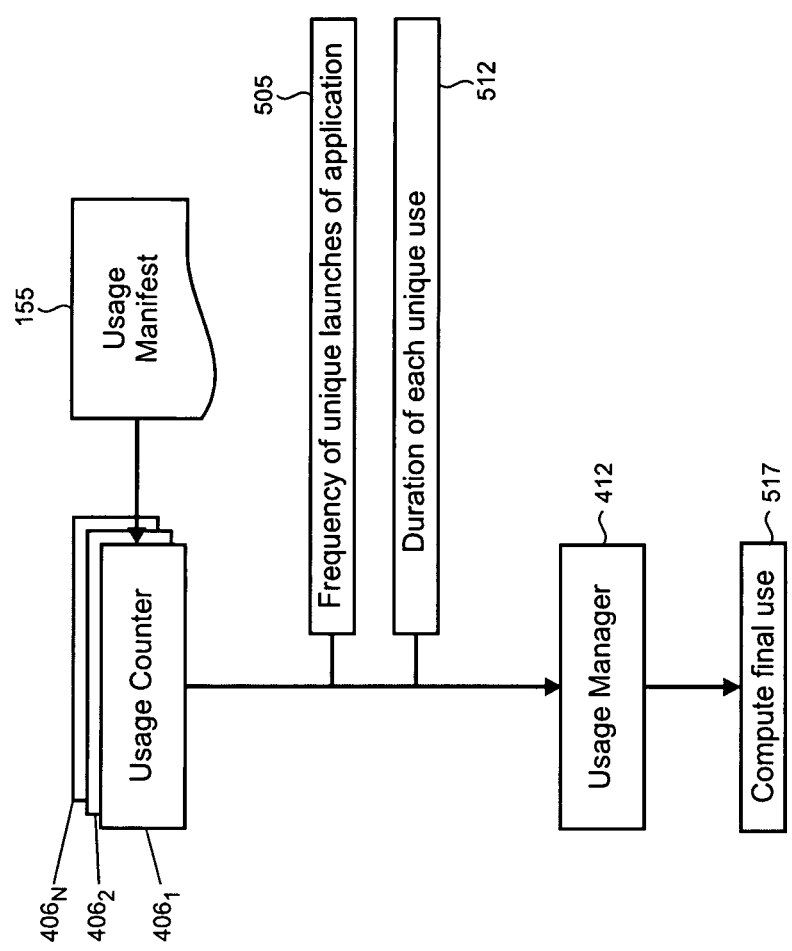
FIG. 5 is a flowchart of an illustrative method for computing software usage.

As shown in FIG. 5, The usage counters 406 translate the monitored actions of the application components 300 into usage metrics which include, for example, the frequency of unique launches of an application 505 (e.g., launches per time period), and the duration of each unique use 512 (e.g., expressed in units of time such as minutes, hours, etc.). The usage manager 412 can use the usage metrics 505 and 512 from a usage counter 406, or combine information for cotemporaneous events from multiple counters 406 to compute a final usage of an application, as indicated by reference numeral 517.

Figure 6:
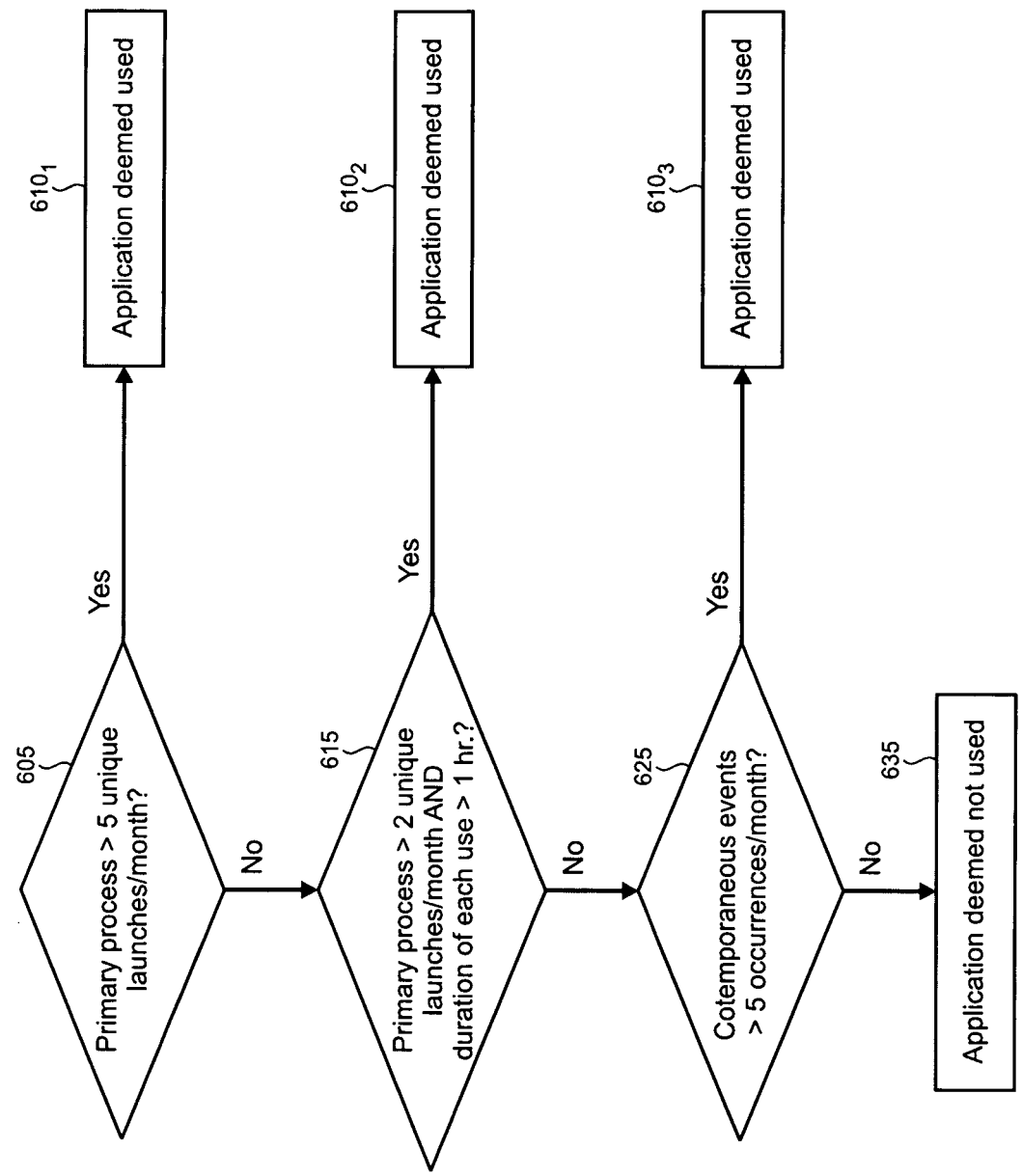
FIG. 6 is a flowchart of an illustrative method for implementing an application usage threshold that sets when an application is considered as being used.

The usage manager applies the usage metrics 505 and 512 against an application usage threshold as shown in FIG. 6. When the usage metrics 505 and 512 exceed the threshold, then an application is deemed as being used. It is emphasized that the thresholds and values shown in FIG. 6 are illustrative and other thresholds and values may be used to meet the needs of a particular implementation.

FIG. 6 shows three threshold conditions 605, 615 and 625, the satisfaction of anyone of them being sufficient to deem an application 112 as being used as indicated by reference numerals $610_{1, 2, 3}$. Otherwise, as indicated by reference numeral 635, the application 112 is deemed as not being used.

At threshold condition 605, if a primary process exceeds five unique launches within a time period of a month, then the application 112 is deemed used ($610_1$). At threshold condition 615, if a primary process exceeds two unique launches within a month, and the duration of each use exceeds one hour, then the application 112 is deemed used ($610_2$). At threshold condition 625, if cotemporaneous events are triggered by application components 300 which exceed five occurrences in a month, then the application 112 is deemed used ($610_3$). Such cotemporaneous events could include, for example, the opening of the network port 126 and utilization of a window from UI 148 at the same time.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for detecting software application usage on a client device, the method comprising the steps of:

categorizing components of applications that are instantiated on the client device, the categorization being performed based on at least one of usage pattern of the components or correlation of the components to active usage, the categorization classifying the components into categories that includes primary processes, user interaction with a user interface and auxiliary processes, wherein primary processes run when the application is being actively used, and terminate when the application is not being actively used, user interaction with a user interface interaction enables detection of the software application usage by monitoring interaction patterns with the user interface, and auxiliary processes run without correlation to application usage;

providing the categorized components as elements in a usage manifest that is published to the client device, the categorized components being respectively monitored by a plurality of usage counters for generating usage metrics based on a frequency of unique launches of an application or a duration of each unique use of an application responsively to the monitoring; and implementing a software usage detection service on the client device, the software usage detection service arranged for monitoring one or more of the components according to the usage manifest to detect usage of the applications based on the categorization of the one or more components.

2. The method of claim 1 in which the usage pattern comprises one of UI interaction through a window or pop up or silent monitoring of the client device.

3. The method of claim 1 including a further step of arranging the elements in the usage manifest to generate one or more signatures for the applications.

4. The method of claim 1 including a further step of categorizing the components based on an intended purpose of the components.

5. The method of claim 1 including a further step of categorizing the components based on processes operating on the client device.

6. The method of claim 1 including a further step of categorizing the components based on an integration of functionality between applications.

7. The method of claim 1 in which a functionality is provided by one of application plug-in, application add-on, or application extension.

8. A computer-readable medium being distinguishable from a transmission signal and containing instructions which, when executed by one or more processors disposed on an electronic device, implements a software application usage detection service arranged for performing a method comprising the steps of:
    implementing a plurality of usage counters that monitor respective components of applications that are instantiated on the electronic device, the components being described by a usage manifest, the usage manifest including elements for categorized components, the categorization being performed based on at least one of usage pattern of the components or correlation of the components to active usage, the categorization classifying the components into categories that includes primary processes, user interaction with a user interface and auxiliary processes, wherein primary processes run when the application is being actively used, and terminate when the application is not being actively used, user interaction with a user interface interaction enables detection of the software application usage by monitoring interaction patterns with the user interface, and auxiliary processes run without correlation to application usage, the usage counters further generating usage metrics based on a frequency of unique launches of an application or a duration of each unique use of an application responsively to the monitoring; and
    implementing a usage manager that is configured for receiving the usage metrics, from one or more of the usage counters, and for computing application usage by comparing the received usage metrics against one or more predetermined thresholds.

9. The computer-readable medium of claim 8 in which the usage metrics include frequency of unique launches of an application.

10. The computer-readable medium of claim 8 in which the usage metrics include duration of each unique use of an application.

11. The computer-readable medium of claim 8 including a further step of configuring the usage counters to perform the monitoring using polling or to perform the monitoring in response to events generated by the applications.

12. The computer-readable medium of claim 8 in which the usage metrics from a single usage counter are utilized independently to compute the application usage.

13. The computer-readable medium of claim 8 in which the usage metrics from a plurality of usage counters are combined to compute the application usage.

14. A method for measuring usage of a composite software application, the method comprising the steps of:
    identifying components in the application by the components' correlation with active user interaction and further by a mode of interaction of the components in order to derive usage patterns for the components;
    classifying the components by the usage patterns into categories that include primary processes, user interaction with a user interface and auxiliary processes, wherein primary processes run when the application is being actively used, and terminate when the application is not being actively used, user interaction with a user interface interaction enables detection of the software application usage by monitoring interaction patterns with the user interface, and auxiliary processes run without correlation to application usage, the classified components being respectively monitored by a plurality of usage counters for generating usage metrics based on a frequency of unique launches of an application or a duration of each unique use of an application responsively to the monitoring;
    implementing one or more monitoring techniques that are specific to each of the classified components;
    collecting usage metrics from the monitoring for each classification of the components; and
    computing a usage for the application based on the usage metrics with the usage counter of the application.

15. The method of claim 14 in which the components comprise a primary process that runs when the application is being actively used, and terminates when the application is not being actively used.

16. The method of claim 14 in which the components comprise a UI window which is open or which receives focus when the application is being actively used.

17. The method of claim 14 in which the components comprise a browser add-on or application extension that is loaded when the application is being actively used.

18. The method of claim 14 in which the components comprise a process that opens a network port or exchanges data over a network.

19. The method of claim 14 in which the components comprise an auxiliary process that does not have an explicit correlation with usage of the application.

20. A client device configured for detecting software application usage comprising:
    a user interface;
    a network port configured for data packet exchange with a network that is external to the client device; and
    a software detection background service configured for
        categorizing components of applications that are instantiated on the client device, the categorization being performed based on at least one of usage pattern of the components or correlation of the components to active usage, the categorization classifying the components into categories that includes primary processes, user interaction with a user interface and auxiliary processes, wherein primary processes run when the application is being actively used, and terminate when the application is not being actively used, user interaction with a user interface interaction enables detection of the software application usage by monitoring interaction patterns with the user interface, and auxiliary processes run without correlation to application usage,
        providing the categorized components as elements in a usage manifest that is published to the client device, the categorized components being respectively monitored by a plurality of usage counters for generating usage metrics based on a frequency of unique launches of an application or a duration of each unique use of an application responsively to the monitoring, and implementing a software usage detection service on the client device, the software usage detection service arranged for monitoring one or more of the components according to the usage manifest to detect usage of the applications based on the categorization of the one or more components.

21. The client device of claim 20 in which the usage pattern comprises one of UI interaction through a window or pop up or silent monitoring of the client device, 22. The client device of claim 20 in which the software detection background service is further configured for arranging the elements in the usage manifest to generate one or more signatures for the applications.

23. The client device of claim 20 in which the software detection background service is further configured for categorizing the components based on an intended purpose of the components.

24. The client device of claim 20 in which the software detection background service is further configured for categorizing the components based on processes operating on the client device.

25. The client device of claim 20 in which the software detection background service is further configured for categorizing the components based on an integration of functionality between applications.

26. The client device of claim 20 in which a functionality is provided by one of application plug-in, application add-on, or application extension.

\* \* \* \* \*